United States Patent [19]

Ruppert et al.

[11] Patent Number: 5,197,327
[45] Date of Patent: Mar. 30, 1993

[54] ROTOR WHEEL ASSEMBLY FOR A TIRE TESTING MACHINE

[75] Inventors: Franz Ruppert, Heppenheim; Joachim Schwab, Fulda, both of Fed. Rep. of Germany

[73] Assignee: Hofmann Maschinenbau GmbH, Pfungstadt, Fed. Rep. of Germany

[21] Appl. No.: 663,162

[22] Filed: Mar. 1, 1991

[30] Foreign Application Priority Data

May 7, 1990 [DE] Fed. Rep. of Germany ....... 4014558

[51] Int. Cl.⁵ .......................................... G01M 17/02
[52] U.S. Cl. .................................. 73/146; 29/894.32
[58] Field of Search ......... 73/146; 29/894.32, 894.321, 29/894.322, 894.323, 894.324

[56] References Cited

U.S. PATENT DOCUMENTS 1,310,246 7/1919 Moore ............................ 29/894.321
3,142,178 7/1964 Gough et al. ......................... 73/146

Primary Examiner—Donald O. Woodiel
Attorney, Agent, or Firm—Cushman, Darby & Cushman

[57] ABSTRACT

In a rotor wheel assembly for a tire testing drum comprising a hub and a testing drum portion which is supported relative to the hub by support means, the support means consists exclusively of discs, with at least three discs arranged symmetrically relative to a central plane passing radially through the hub. The support discs may comprise first and second conical discs and at least one flat disc.

11 Claims, 4 Drawing Sheets

ROTOR WHEEL ASSEMBLY FOR A TIRE TESTING MACHINE

BACKGROUND OF THE INVENTION

Tire testing machines generally involve a tire which is to be tested being rolled under a loading against the outside peripheral surface of a cylindrical testing drum. The testing speeds at which the tire is rotated are usually very high and may be over 300 kph in known tire testing machines. That in turn involves the testing drum to also rotate at a very high speed.

In the case of a construction in which the testing drum is formed by a rotor wheel assembly comprising a rotatably mounted hub, a hollow-cylindrical testing drum portion surrounding the hub, and a supporting means for supporting the testing drum portion with respect to the hub, various operational difficulties may occur. To permit such difficulties to be more readily appreciated, reference will be directed at this point to FIGS. 1 and 2 of the accompanying drawings, showing a known rotor wheel assembly for a tire testing machine. FIG. 1 shows in its left-hand half a view on to the end face of the rotor wheel assembly while the right-hand half of FIG. 1 shows a view in section taken radially through the center of the rotor wheel assembly. FIG. 2 is a view in section taken along section line A-C in FIG. 1.

In the case of the rotor wheel assembly shown in FIGS. 1 and 2, a support means disposed between the hub 32 and the testing drum portion 33 is formed by two lateral flat support discs indicated at 17 in FIG. 1, and in addition radially extending spokes 14 and ribs 15. It has been found that at high testing speeds the peripheral portion constituting the testing drum portion 33 and against the outside surface of which a tire to be tested is applied under a pressure loading experiences deformation at its contact surface in an irregular fashion due to centrifugal forces or due to the external loading applied thereto. Such deformation can be clearly seen in the right-hand half of FIG. 1, in comparison with the undeformed structure shown in the left-hand half of FIG. 1, while the upper part of FIG. 2 also shows the structure which is deformed by centrifugal force, in qualitative terms. If during a tire testing operation for testing the degree of uniformity of the tire, measurements in respect of irregularities in the forces involved in the combination of the rotor wheel assembly and the tire being tested thereagainst are made, the measurement values produced in that operation may frequently be falsified by the above-mentioned deformity of the rotor wheel assembly. A considerable amount of expenditure in terms of measuring procedure and equipment will then be required in order to provide compensation for the falsification of the measurement values produced by the assembly.

SUMMARY OF THE INVENTION

An object of the present invention is to provide a rotor wheel assembly for a tire testing machine which can at least substantially avoid deformation of the structure thereof, in particular in the region of the portion constituting the tire testing surface.

Another object of the present invention is to provide a rotor wheel assembly for a tire testing machine which is of a simple, rational design configuration better adapted to withstand the operating stresses involved in a tire testing operation.

Still another object of the present invention is to provide a rotor wheel assembly for a tire testing machine, which is so designed as to afford enhanced resistance to structural deformation thereof in both radial and axial directions to provide a geometrically stable construction.

Yet a further object of the present invention is to provide a rotor wheel assembly for a tire testing machine which is so designed that it can be a lighter construction so as to afford an improved level of measuring sensitivity in operation of the machine.

In accordance with the present invention the foregoing and other objects are attained by a rotor wheel assembly for a tire testing machine comprising a hub, a hollow-cylindrical testing drum portion surrounding the hub in concentric relationship therewith, and a support means for supporting the testing drum portion relative to the hub. The support means consists exclusively of discs, wherein at least three discs which are arranged symmetrically with respect to a diametral central plane form the support means.

Thus, the construction of the rotor wheel assembly according to the invention provides that the support means operatively disposed between the hub and the testing drum portion is exclusively of a disc configuration, thereby ensuring that the rotor wheel assembly enjoys improved stiffness both in the radial and in the axial directions, while also being of a unitary nature in the radial direction. Accordingly, centrifugal forces which are produced at high speeds of rotation of the rotor wheel assembly no longer cause the structure of the assembly to suffer from deformation such as to constitute an impairment in the testing operation. Furthermore, it is possible for the rotor wheel assembly to carry external loadings applied thereto without suffering deformation, because of the enhanced stiffness of the assembly. The disc supports between the hub and the testing drum portion provide a geometrically stable construction so that it is possible to use thinner material for the structure of the rotor wheel assembly, thus giving rise to lower moments of inertia which are of significance in particular at high speeds of rotation of the assembly and which make it possible to achieve an improvement in the level of measuring sensitivity, especially when dealing with testing operations involving a high level of dynamics.

Furthermore, in comparison with the known structure of a tire testing drum, the construction according to the invention makes it possible to achieve a reduction in the length of the connecting locations between the support means and the hub and testing drum portion, which are conventionally formed by welded seams. With the structure of the assembly according to the invention, the connections can be about 60% shorter than in the known designs. It will be appreciated that that is not only advantageous from the welding procedure point of view, but it also affords an improvement in terms of rigidity of the structure in the radial and axial directions.

Various preferred forms of the rotor wheel assembly according to the invention may involve different combinations of pluralities of discs constituting the support means between the rotatably mounted hub of the rotor wheel assembly and the testing drum portion thereof.

Further objects, features and advantages of the present invention will be apparent from the following description of preferred embodiments thereof.

DESCRIPTION OF THE PREFERRED EMBODIMENTS

Figure 2:
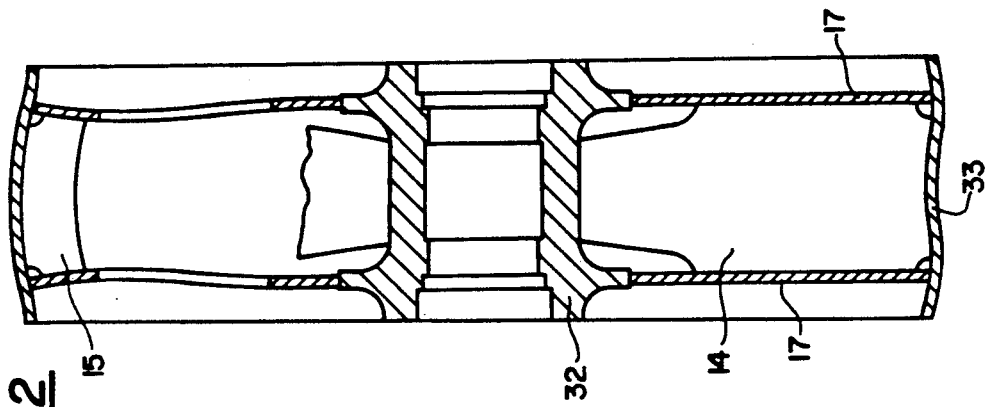
FIG. 2 is a sectional view of the assembly shown in FIG. 1, in section taken along line A-C.

Referring first generally to FIGS. 3 through 8, rotor wheel assemblies generally indicated at reference numeral 1, for a tire testing machine, constituting embodiments of the present invention, comprise a hub 2 which in use is suitably rotatably mounted, and a peripheral ring portion constituting a testing drum portion 3 against which a tire to be tested is pressed in operation of a tire testing machine. The testing drum portion 3 is supported relative to the hub 2 by way of a support means indicated generally at 4 in for example FIG. 3, the support means in accordance with the invention being exclusively of a disc mode of construction. As indicated, the hub 2 can be rotatably mounted in a tire testing machine for rotation about its axis as indicated at D in for example FIG. 4, in any suitable manner which is not shown in the drawing. The testing drum portion 3 and the hub 2 have equal axial length.

Figure 4:
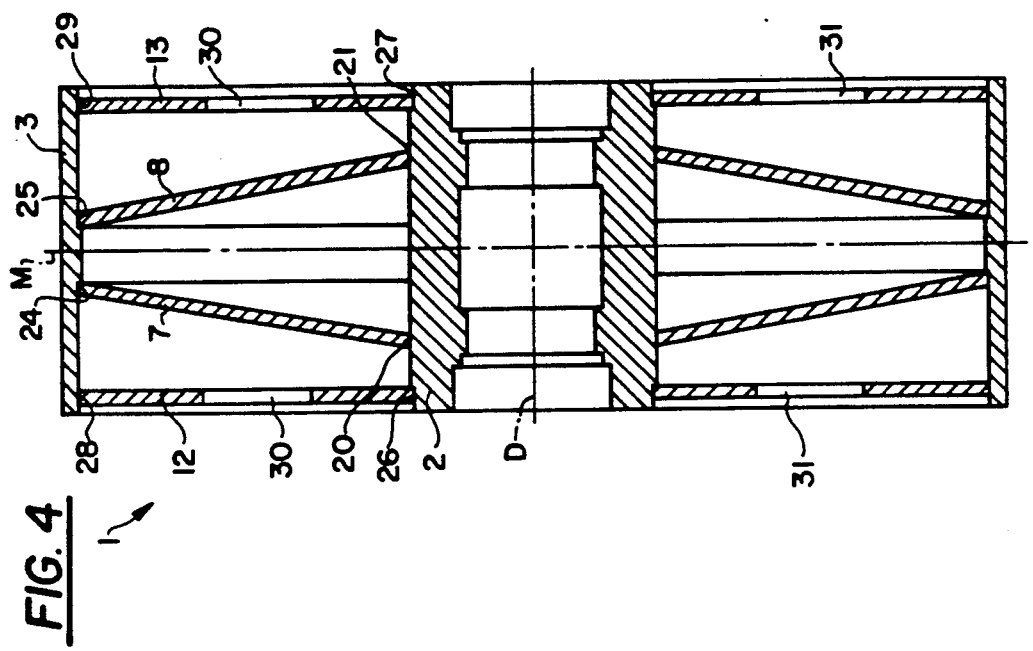
FIG. 4 is a sectional view of the assembly shown in FIG. 3, in section taken along line IV—IV in FIG. 3.

In the illustrated embodiments of the invention, the disc support means 4 consists of a combination of at least first and second discs 7 and 8 of a conical configuration, as shown in FIG. 4, in conjunction with first and second flat discs indicated at 12 and 13 in FIG. 4. The support means 4 shown in FIGS. 5 and 6 consists of first and second discs 5 and 6 similarly arranged in a conical configuration, in conjunction with at least one flat disc as indicated at 9 in FIG. 6. In the assembly shown in FIGS. 7 and 8, the support means 4 again consists of at least first and second discs 5 and 6 of a conical configuration, as shown in FIG. 8, in conjunction with at least two further flat discs as indicated at 10 and 11 in FIG. 8.

Figure 6:
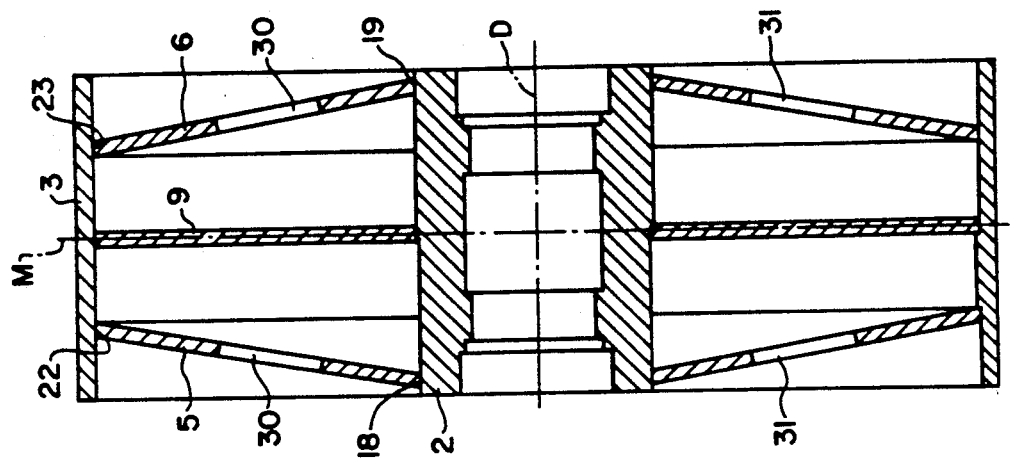
FIG. 6 is a sectional view taken along line VI—VI in FIG. 5.
Figure 8:
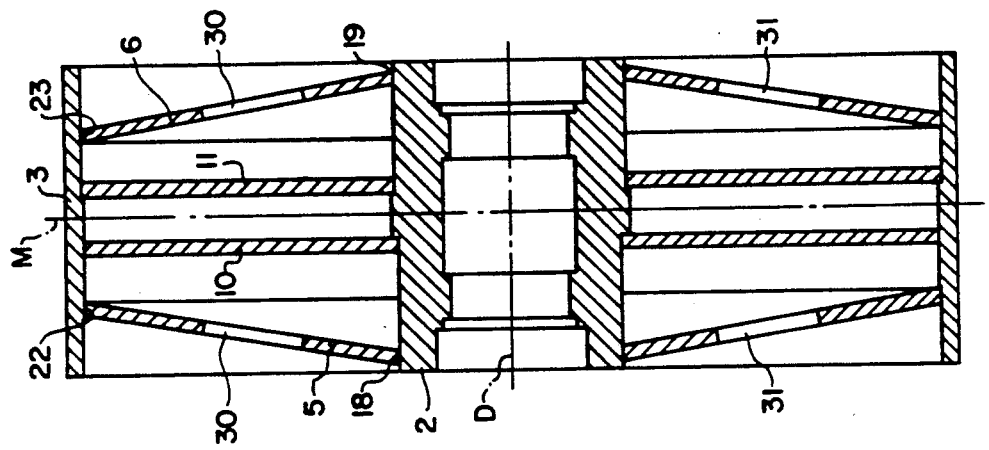
FIG. 8 is a sectional view taken along line VIII—VIII in FIG. 7.

It will be seen from FIGS. 4, 6 and 8 respectively that the discs acting as the support discs between the hub 2 and the testing drum portion 3 are arranged symmetrically with respect to a plane M which extends through the rotor wheel assembly substantially centrally of the axis thereof, perpendicularly to that axis, that is to say diametrally or radially through the hub 2. In addition, the exterior periphery of the discs 5 and 6 as well as 12 and 13, are displaced inwardly toward the central plane M from the outer edge of the axial ends of testing drum portion 3 and central hub 2. The flat discs indicated at 12 and 13 in FIG. 4, 9 in FIG. 6 and 10 and 11 in FIG. 8 are each disposed parallel to the plane M extending through the rotor wheel assembly 1. It will be appreciated that in the embodiment shown in FIG. 6 the single flat support disc 9 is actually disposed in the plane M.

The support discs of the structures according to the invention are in the form of annular discs, with the inside periphery of each of the annular discs being suitably connected to the hub 2 and the outside periphery of each of the discs being suitably connected to the testing drum portion 3 and more particularly the radially inwardly facing surface thereof. FIG. 4 shows the connections between the respective discs and the hub 2 at references 20, 21, 26 and 27, FIG. 6 shows the connections between the discs 5 and 6 and the hub 2 at 18 and 19, with the connection between the disc 9 and the hub 2 not being referenced, while FIG. 8 shows the connections between the discs 5 and 6 at 18 and 19, with the connections between the discs 10 and 11 and the hub 2 not being referenced. Similarly, FIG. 4 shows the connections between the respective discs and the testing drum portion 3 at 24, 25, 28 and 29, FIG. 6 references the connections between the discs 5 and 6 and the testing drum portion 3 at 22 and 23 while FIG. 8 similarly references those connections at 22 and 23. The connections involved are preferably produced by welding such as welded seams. It will be seen therefore that all the connections between the hub 2 and the testing drum portion 3 in the illustrated embodiments of the invention are circular connections which are disposed around the axis of rotation D of the hub 2 and which are preferably in the form of welded seams.

Figure 3:
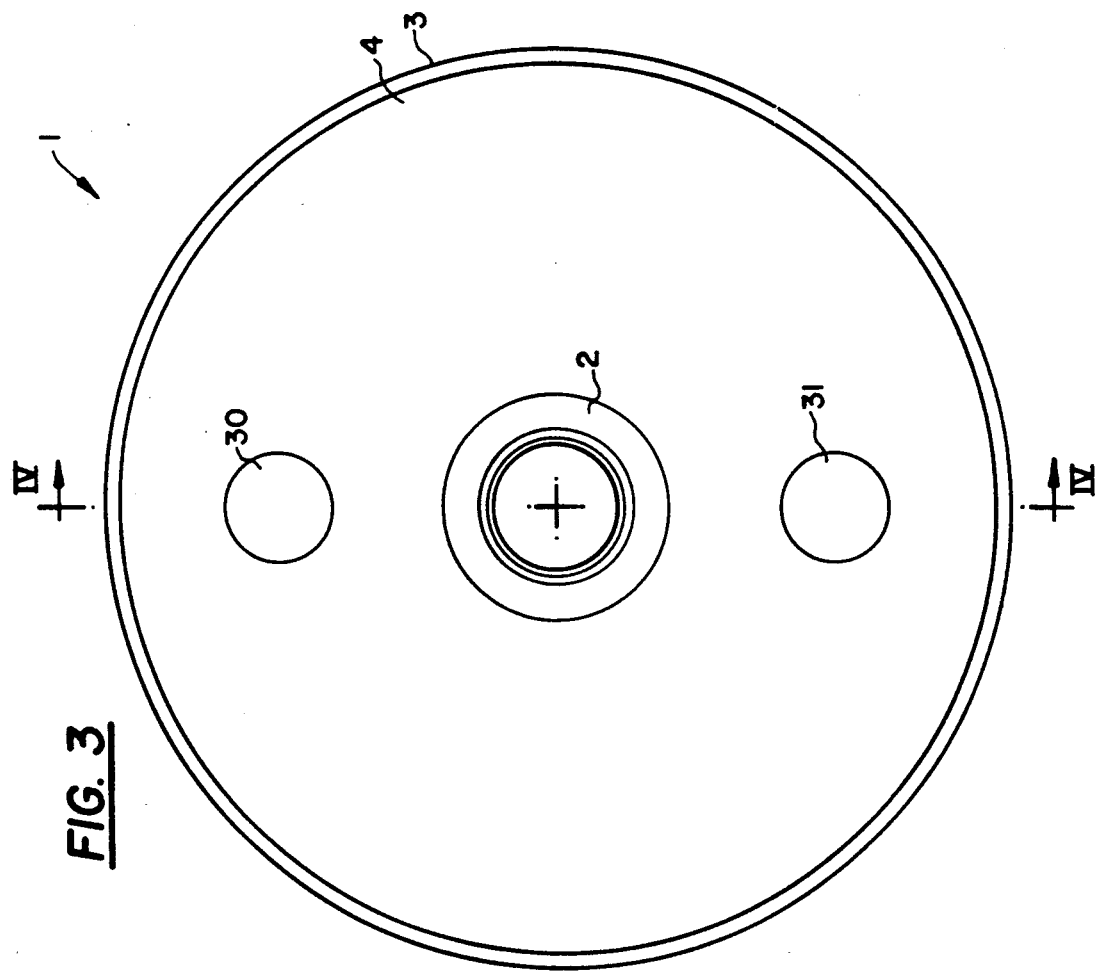
FIG. 3 is a view on to the end face of a first embodiment of the present invention.

Attention will now be specifically directed to the embodiment shown in FIGS. 3 and 4 which has support discs consisting of first and second outer discs 12 and 13 which are of a flat configuration. The two outer flat discs 12 and 13 are connected to the hub 2 and the testing drum portion 3 at the axially outward ends of each thereof, at the circular connecting locations indicated at 26, 27, 28 and 29. The support discs further include first and second discs 7 and 8 which are disposed inwardly of the outer discs 12 and 13 and which extend in a conical configuration, that is to say, they converge towards each other in a radially outward direction from the hub 2, and they are connected to the hub 2 and the testing drum portion 3 at the connections 20, 21, 24 and 25. It will be seen that the connecting locations or welded seams 20 and 21 are further away from the plane M than the two annular connections or seams 24 abd 25, by virtue of the discs 7 and 8 being arranged inclinedly relative to the plane M.

Figure 5:
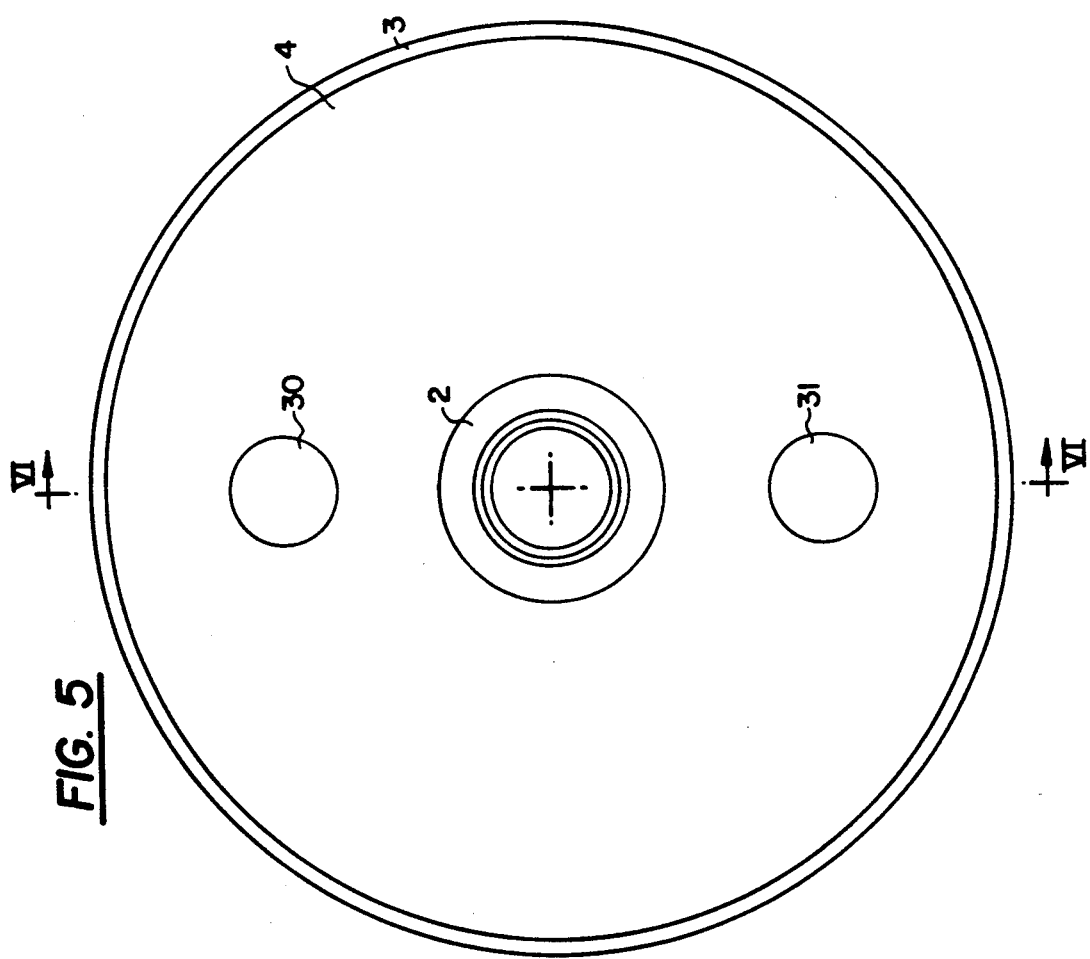
FIG. 5 is a view corresponding to that shown in FIG. 1 of a second embodiment of the present invention.

Looking now at the embodiment shown in FIGS. 5 and 6, the support discs again consist of first and second outer support discs 5 and 6 arranged in a conical or mutually converging configuration, similarly to the inner discs described above in relation to FIG. 4. The circular connections or welds 18 and 19 between the hub 2 and the discs 5 and 6 are disposed at the axially outward ends of the hub 2 while the connections 22 and 23 between the outer peripheries of the discs 5 and 6 and the radially inwardly facing surface of the testing drum portion 3 are displaced inwardly towards the plane M. This embodiment further includes a single flat disc 9 which is disposed in the plane M between the two outer support discs 5 and 6.

Figure 7:
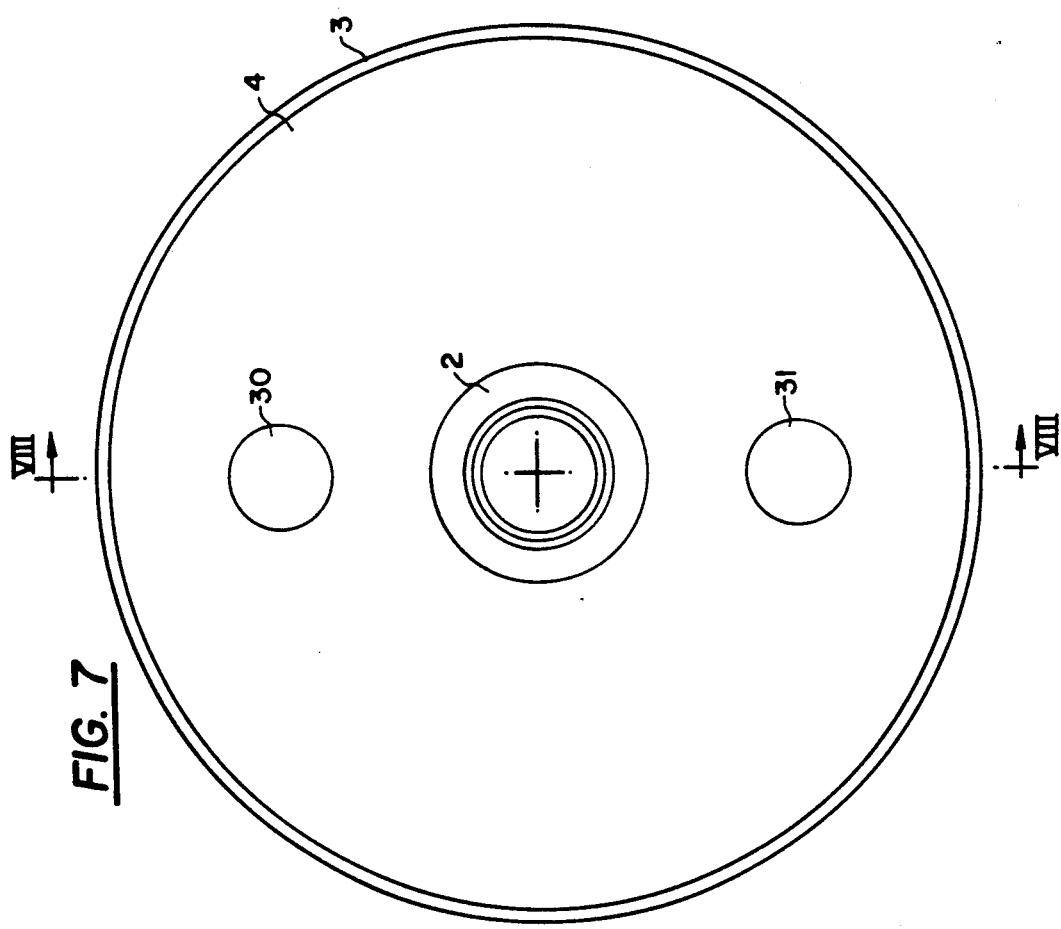
FIG. 7 is a view corresponding to that shown in FIG. 1 of a third embodiment of the invention.

In the embodiment shown in FIGS. 7 and 8, the support means of the rotor wheel assembly again comprises first and second mutually converging discs 5 and 6 which constitute outer support discs. The connections 18 and 19 between the discs 5 and 6 and the hub 2, and the connections 22 and 23 between the discs 5 and 6 and the testing drum portion 3 are disposed in substantially the same arrangement as in the FIG. 6 embodiment. Instead of the single flat disc 9 in the FIG. 6 embodiment however, the embodiment shown in FIGS. 7 and 8 has two inner flat discs 10 and 11 which are therefore disposed between the support discs 5 and 6. The support discs 10 and 11 extend substantially parallel to the axial plane M and are arranged symmetrically on both sides of the plane M, between the outer discs 5 and 6.

As indicated above, the single centrally disposed disc 9 shown in FIG. 6 and the two inwardly disposed flat annular discs 10 and 11 shown in FIG. 8 are connected to the hub 2 and the testing drum portion 3 in annular connecting locations (not identified in greater detail in the drawings) disposed around the common axis of rotation D, for example in the form of step configurations in the radially outward surface of the hub 2 and the radially inward surface of the testing drum portion 3. The connections are preferably also in the form of welds.

Figure 1:
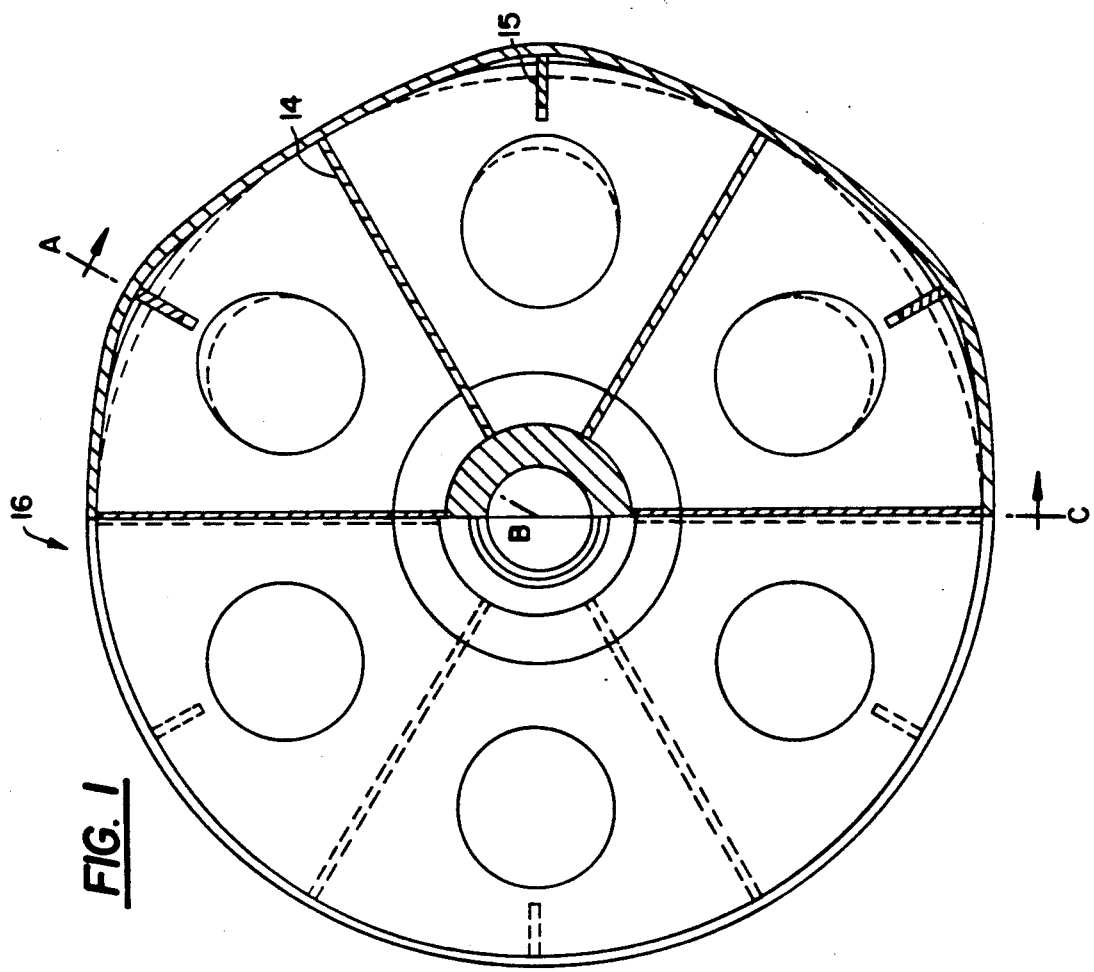
FIG. 1 is a partly sectional view of the end face of a known rotor wheel assembly.

As FIGS. 3 through 8 show, the respective outwardly disposed discs of each of the rotor wheel assemblies illustrated in accordance with the invention may have circular openings therein, which are each at the same angular spacings from each other, like for example the construction shown in FIG. 1. In the embodiments illustrated herein each rotor wheel assembly has only two such openings as indicated at 30 and 31 respectively. That gives a further reduction in the amount of material involved, without adversely affecting the uniform radial rigidity of the structure.

It will be appreciated that the above-described embodiments of the invention have been set forth solely by way of example and illustration of the principles thereof and that various modifications and alterations may be made therein without thereby departing from the spirit and scope of the invention.

What is claimed is:

1. A rotor wheel assembly for a tire testing machine comprising:
    a hub;
    a hollow-cylindrical testing drum portion, said testing drum portion and said hub having equal axial length, and
    means for supporting the testing drum portion relative to the hub, the support means being disposed between the hub and the testing drum portion, the support means comprising:
        at least first and second discs of conical configuration being disposed substantially symmetrical with respect to a central plane extending radially through the assembly, and
        at least one flat disc being disposed parallel to said plane,
        each of the first and second conical discs having inner and outer peripheries, each of the inner peripheries being directly connected to the hub, each of the outer peripheries being directly connected to the testing drum portion, each of the connections of the inside peripheries to the hub being further outward relative to said plane than each of the connections of the outside peripheries to the testing drum, each direct connection of the inner and outer peripheries being displaced inwardly with respect to axial ends of said testing drum portion toward said central plane.

2. An assembly as set forth in claim 1 wherein in the axial extent of the assembly of the hub and the testing drum portion the first and second conical discs are arranged at outward position and at least one flat disc is arranged therebetween.

3. An assembly as set forth in claim 2 wherein first and second flat discs are arranged internally of said outward discs.

4. An assembly as set forth in claim 2 wherein a said flat disc is arranged in said plane.

5. An assembly as set forth in claim 2 wherein the connecting locations between the outwardly disposed conical discs and the hub are at the axial ends of the hub.

6. An assembly as set forth in claim 1 wherein the connecting locations between the discs on the one hand and the hub and the testing drum portion respectively on the other hand are arranged on circles, the center points of which are disposed on the axis of rotation of the wheel assembly.

7. An assembly is set forth in claim 1, wherein said direct connections of the inner and outer peripheries to hub and testing drum portion respectively are welded seams.

8. A rotor wheel assembly for a tire testing machine comprising:
    a hub;
    a hollow-cylindrical testing drum portion, and
    means for supporting the testing drum portion relative to the hub, the support means being disposed between the hub and the testing drum portion, the support means comprising:
        at least first and second discs of conical configuration being disposed substantially symmetrical with respect to a central plane extending radially through the assembly, and
        at least first and second flat discs being disposed parallel to said plane,
    each of the first and second conical discs having inner and outer peripheries, each of the inner peripheries being connected to the hub, each of the outer peripheries being connected to the testing drum portion, each of the connections of the inside peripheries to the hub being further outward relative to said plane than each of the connections of the outside peripheries to the testing drum, wherein in the axial extent of the assembly of the hub and the testing drum portion, said at least first and second flat discs are arranged at outward positions and said at least first and second conical discs are arranged inwardly thereof.

9. An assembly as set forth in claim 8 wherein the connecting locations between the outwardly disposed flat discs and the hub and the testing drum portion are at the axial ends of the hub and the testing drum portion respectively.

10. A tire testing machine comprising:
    a testing drum adapted to permit a tested tire to be loaded against the drum, the drum including a rotatably mounted elongated hub, said testing drum and said hub having equal axial length,
    a peripheral portion concentrically disposed around the hub providing a peripheral rolling surface for receiving the tire load, and
    means for supporting said peripheral portion on said hub, said support means including:
        at least first and second conical discs, and
        at least one flat disc, each of said conical and flat discs having an inner periphery and an outer periphery, each of said inner peripheries being directly connected to the hub, each of the outer peripheries being directly connected to the peripheral portion, the conical and flat discs being spaced apart from each other in the axial direction of the hub and being symmetrical with respect to a central plane extending radially through the machine, each direct connection of the inner and outer peripheries being displaced inwardly with respect to axial ends of said testing drum portion toward said central plane.

11. A tire testing machine comprising:

a testing drum adapted to permit a tested tire to be loaded against the drum, the drum including a rotatably mounted elongated hub, a peripheral portion concentrically disposed around the hub providing a peripheral rolling surface for receiving the tire load, and means for supporting said peripheral portion on said hub, said support means including:

at least first and second conical discs, and at least first and second flat discs, each of said conical and flat discs having an inner periphery and an outer periphery, each of said inner peripheries fixed to the hub, each of the outer peripheries fixed to the peripheral portion, the conical and flat discs being spaced apart from each other in the axial direction of the hub and being symmetrical with respect to a central plane extending radially through the machine, said at least first and second flat discs being arranged at outward positions and said at least first and second conical discs being arranged inwardly thereof.

* * * * *